Oct. 20, 1925
W. G. SEXAUER
1,558,053
TWO-WAY REPEATER AND AMPLIFIER
Filed Jan. 25, 1923
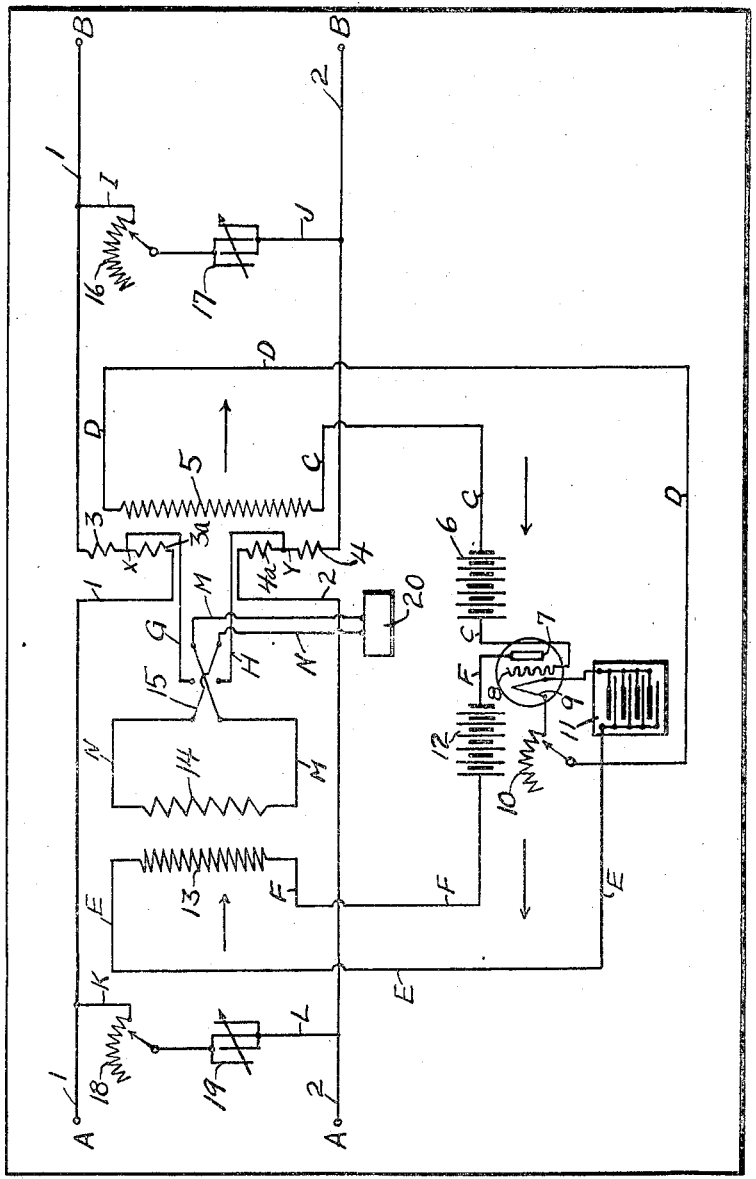
Will G. Sexauer
Inventor
By John M. Spellman
Attorney Patented Oct. 20, 1925.

1,558,053

UNITED STATES PATENT OFFICE.

WILL G. SEXAUER, OF SAN ANTONIO, TEXAS.

TWO-WAY REPEATER AND AMPLIFIER.

Application filed January 25, 1923. Serial No. 614,875.

*To all whom it may concern:*

Be it known that I, WILL G. SEXAUER, citizen of the United States, residing at San Antonio, in the county of Bexar and State of Texas, have invented certain new and useful Improvements in Two-Way Repeaters and Amplifiers, of which the following is a specification.

This invention relates to a two-way repeater and amplifier of voice currents.

The invention consists of a portable set, comprising an exciting or input transformer, a vacuum tube, an output transformer, and variable balancing circuits. The exciting transformer consists of a primary and secondary winding. The primary winding is divided into four equally balanced parts, which are connected in series in the circuit, two coils being placed in each side. The secondary coil of the input transformer is connected to the grid circuit of the tube, and the plate circuit of the tube is connected to the primary winding of the output transformer. The secondary winding of the output transformer is connected across the line at the mid points of the split primary coil of the input transformer.

The balancing arrangement is such as to balance both sides of the circuit beyond the mid points of the primary of the input transformer.

A feature of the invention is that the device is portable and of simple construction.

Another feature is the provision for a loud speaker and supervision connections.

Another feature is that it may be operated on various types of circuits, at a terminal or any point between the terminals.

An additional feature is that if the vacuum tube burns out during a conversation through the circuit, there is no interruption of the conversation.

Another feature is that the set may be used on different circuits as desired, being readily adjustable to the particular circuit.

Other useful and novel features will be set forth in the description following, taken in connection with the drawings attached hereto and as follows:

The figure shows a top or plan view of the invention.

Referring to said figure, with the repeater at any point in a circuit, voice currents from either direction entering on line 1, at points A or B, pass through primary coils 3 and 3ª, thence to line 2 at points A or B, through the other half of the primary coils 4 and 4ª. The currents in passing through coils 3—3ª—4 and 4ª are induced into coil 5, the secondary winding and introduced into the grid circuit of the vacuum tube at a suitable potential for excitation. Due to the construction of the exciting transformer, which is of suitable material and design, the proper amount of energy is taken from the line. The currents from coil 5 are carried on lines C,—C and D—D to the grid circuit. Battery 6 maintains the grid at a suitable potential for excitation. Battery No. 11 lights the filament 9, being controlled by rheostat 10. The grid circuit extends from coil 5, through line C, to battery 6, to grid 8, to filament 9, thence to line D, returning to the other side of coil 5. The currents, in passing through the grid circuit, cause the plate circuit to function and reproduce the currents at an amplified value. The plate circuit extends from plate 7 to filament 9, thence on line E to coil 13,—primary winding of the output transformer, and from coil 13 on line F, through battery 12, to plate 7. From the primary 13 of the output transformer, the currents are transferred to coil 14, the secondary winding. The output transformer is designed and constructed to bring about the proper transformation for introducing the amplified currents back into the line. From coil 14 the currents are carried into the points X and Y, the mid points of the primary windings of the exciting transformer. From points X and Y the currents flow in both directions. When the balancing arrangement K—18—19—L and I—16—17—J are adjusted to balance both sides of the completed circuit beyond the points X and Y, the currents in dividing tend to neutralize the effect of coils 3, 3ª, 4, 4ª upon coil 5. In this manner the tube is controlled and prevented from howling or singing.

The reversible switch 15 is used to connect the coil 14 in proper manner to points X and Y of the input transformer. Lines M and N from the switch 15, comprise the connection for a loud speaker or supervision circuits, as desired.

What is claimed is:

1. In a two-way repeater and amplifier of voice currents, an input transformer, an output transformer, one of said transformers having a pair of primary coils connected respectively to two lines, means for connecting each of the pair of coils to the secondary coil of the companion transformer, variable balancing circuits on the remote sides of the two transformers, and means for connecting in a receiving instrument on said first means.

2. In a two-way repeater and amplifier of voice currents, an input transformer, an output transformer, one of said transformers having a pair of primary coils connected respectively to two lines, means for connecting each of the pair of coils to the secondary coil of the companion transformer and including a double switch, a receiving instrument connected to the latter, a vacuum tube having a grid, plate and filament therein connected in circuit with the secondary coil of the transformer which has the pair of primary coils and with the primary coil of the companion transformer, and variable balancing circuits on the remote sides of the transformers.

In testimony whereof I have signed my name to this specification.

WILL G. SEXAUER.